(12) United States Patent
Conway et al.

(10) Patent No.: US 10,317,136 B2
(45) Date of Patent: Jun. 11, 2019

(54) ONSITE ULTRA HIGH PURITY CHEMICALS OR GAS PURIFICATION

(71) Applicant: AIR PRODUCTS AND CHEMICALS, INC., Allentown, PA (US)

(72) Inventors: Timothy Edward Conway, Allentown, PA (US); Vladimir Yliy Gershtein, Allentown, PA (US); Jeffrey Alan Hopkins, Whitehall, PA (US); Brian M. Lindenmuth, Whitehall, PA (US); Thomas M. Booth, Kempton, PA (US)

(73) Assignee: VERSUM MATERIALS US, LLC, Tempe, AZ (US)

( * ) Notice: Subject to any disclaimer, the term of this patent is extended or adjusted under 35 U.S.C. 154(b) by 726 days.

(21) Appl. No.: 14/940,612

(22) Filed: Nov. 13, 2015

(65) Prior Publication Data
US 2016/0069612 A1 Mar. 10, 2016

Related U.S. Application Data

(62) Division of application No. 13/839,497, filed on Mar. 15, 2013, now Pat. No. 9,216,364.

(51) Int. Cl.
*B01D 53/02* (2006.01)
*F25J 3/08* (2006.01)
*B01D 3/42* (2006.01)

(52) U.S. Cl.
CPC .............. *F25J 3/08* (2013.01); *B01D 3/4294* (2013.01)

(58) Field of Classification Search
CPC ................................. B01D 3/4294; F25J 3/08
See application file for complete search history.

(56) References Cited

U.S. PATENT DOCUMENTS

| | | | | |
|---|---|---|---|---|
| 4,246,079 A | * | 1/1981 | Goodrich | C07C 7/1485 205/746 |
| 4,488,884 A | * | 12/1984 | Parigi | C01B 7/01 423/488 |
| 5,147,429 A | * | 9/1992 | Bartholomew | B01D 46/42 244/30 |
| 5,259,869 A | * | 11/1993 | Auvil | B01D 53/268 95/52 |
| 5,382,280 A | * | 1/1995 | Choe | B01D 53/047 95/105 |
| 6,032,483 A | | 3/2000 | Paganessi et al. | |

(Continued)

FOREIGN PATENT DOCUMENTS

| CN | 1190913 A | 8/1998 |
|---|---|---|
| CN | 200620109078 | 1/2008 |

(Continued)

*Primary Examiner* — Christopher P Jones
(74) *Attorney, Agent, or Firm* — Lina Yang

(57) ABSTRACT

An onsite purification plant/system to delivery high and ultra high purity product, such as, process chemicals, industrial and specialty gases to manufacturing processes within the onsite plant turndown ratio from 0% to 100% while preserving the predetermined purity of the supplied substances within a predefined specification range is provided. Preserving liquid/vapor ratio in at least one of the purification means/units ensuring that product purity range stays unchanged is achieved by redirecting the product back into the onsite purification plant/system.

20 Claims, 2 Drawing Sheets

(56) References Cited

U.S. PATENT DOCUMENTS

| | | | |
|---|---|---|---|
| 6,183,720 B1* | 2/2001 | Laederich | C01B 7/0731 |
| | | | 423/238 |
| 6,187,077 B1* | 2/2001 | Li | B01D 53/229 |
| | | | 95/131 |
| 6,200,414 B1 | 3/2001 | Hwang et al. | |
| 6,293,999 B1* | 9/2001 | Cheng | B01D 53/0462 |
| | | | 95/103 |
| 6,315,818 B1* | 11/2001 | Monereau | B01D 53/047 |
| | | | 95/105 |
| 6,372,022 B1 | 4/2002 | Hoffman et al. | |
| 6,395,064 B1 | 5/2002 | Xu et al. | |
| 6,616,014 B1 | 9/2003 | Pozniak et al. | |
| 6,923,568 B2 | 8/2005 | Wilmer et al. | |
| 7,297,181 B2* | 11/2007 | Zhou | B01D 53/02 |
| | | | 203/DIG. 16 |
| 7,371,313 B2* | 5/2008 | Del Prato | B01D 53/79 |
| | | | 205/552 |
| 8,216,344 B2* | 7/2012 | Degenstein | B01D 53/002 |
| | | | 95/129 |
| 2002/0128148 A1* | 9/2002 | Alvarez, Jr. | B01D 15/00 |
| | | | 502/53 |
| 2003/0005823 A1* | 1/2003 | Le Blanc | B01D 19/0057 |
| | | | 95/149 |
| 2007/0007879 A1 | 1/2007 | Berman, Jr. et al. | |
| 2010/0083697 A1* | 4/2010 | Degenstein | B01D 53/002 |
| | | | 62/636 |
| 2010/0254868 A1* | 10/2010 | Obee | A61L 9/015 |
| | | | 423/210 |
| 2011/0094378 A1* | 4/2011 | Mitariten | B01D 53/229 |
| | | | 95/50 |
| 2011/0126459 A1 | 6/2011 | Haik-Beraud et al. | |
| 2012/0009114 A1* | 1/2012 | Chen | B01D 19/0005 |
| | | | 423/437.1 |
| 2012/0222556 A1* | 9/2012 | Filipovic | A61M 16/009 |
| | | | 95/142 |
| 2012/0238793 A1* | 9/2012 | Cullinane | B01D 19/0036 |
| | | | 585/833 |
| 2014/0017622 A1* | 1/2014 | Chen | B01D 19/0005 |
| | | | 432/29 |
| 2014/0020559 A1* | 1/2014 | Meirav | B01D 53/0438 |
| | | | 95/148 |

FOREIGN PATENT DOCUMENTS

| | | |
|---|---|---|
| CN | 201214627 | 4/2009 |
| CN | 201376897 | 1/2010 |
| EP | 0 949 470 A2 | 10/1999 |
| EP | 1 127 658 A2 | 8/2001 |
| EP | 1 305 107 A2 | 5/2003 |
| JP | 2003183021 | 7/2003 |
| JP | 2004163003 A | 6/2004 |
| JP | 2006206410 A | 8/2006 |
| JP | 2008007378 A | 1/2008 |
| JP | 2014005157 A1 | 1/2014 |
| KR | 20000011477 A | 2/2000 |
| KR | 20070050405 A | 12/2007 |
| KR | 20100007186 A | 1/2010 |
| TW | 306021 B | 5/1997 |
| WO | 01/45819 A1 | 6/2001 |
| WO | 2006/005990 A1 | 1/2006 |

\* cited by examiner

ONSITE ULTRA HIGH PURITY CHEMICALS OR GAS PURIFICATION

CROSS REFERENCE TO RELATED APPLICATIONS

The present patent application is a divisional application of U.S. patent application Ser. No. 13/839,497 which was filed on Mar. 15, 2013.

BACKGROUND OF THE INVENTION

This invention relates generally to the onsite purification plant supplying high purity (HP), and ultra high purity (UHP) chemicals, industrial, and specialty gases.

One of the major concerns in the semiconductor manufacturing industry at every stage of the manufacturing processes is contaminants. Contaminants introduced into a manufacturing process may change the final product properties drastically. As the result, a production line may be stopped and closed for decontamination. That may lead to: first, disqualification of a significant amount of already manufactured electronic devices and second, it may stall the production for a period of time. Both events may be translated into significant losses in revenue for electronics fabrication facilities. That is why the issue of production line contamination is important to address from the very initial steps in the electronics production processes.

Number of publications deals with onsite purification plants and supply of chemicals and specialty gases. Some publications concern with better mixing of chemicals as, for example, described in U.S. Pat. No. 6,616,014, EP 1127658, U.S. Pat. No. 6,923,568, EP 1305107, and U.S. Pat. No. 6,200,414B1. Different systems and methods are offered to minimize the change in composition of chemical solutions delivered and used in manufacturing processes of electronic devices. In addition, U.S. Pat. No. 6,200,414B1 for example, offering the system and method for controlling temperature and pressure of the chemicals used in wafer etching processes. This patent suggests continuous recirculation of the chemicals through a bypass line when the tool is in the process of changing wafers and the flow of chemicals should be stopped. The described system was designed with high turn down ratio. On the other hand, the suggested system utilizes chemical solutions which are reusable and may be recollected in the main chemical tank over and over again. Minor cleaning of the returned solution may be required but no major purification devices and systems were discussed.

Other publications concern with purification of chemicals and gases.

For example, U.S. Pat. No. 7,371,313 patent offers the invention of ammonia purification. The ammonia stream is produced at ammonia generation facility and follows the sequence of purification steps until it reaches the desired purity level. All purification steps may be separate or connected to each other to handle the desired UHP product purity at the end of the purification process. The system works for a constant flow of crude ammonia stream and would have a limited turn down ration with respect of preservation of the final product purity.

Another system is offered in US 2007007879A. The system supplies a purified product to the point of use based on vaporization of the product liquid fraction and delivery of the product vapor fraction to the point of use. The system utilizes one step purification stage and is applicable for UHP delivery when the liquid fraction is already at UHP level and only possible concentrated heavy impurities such as heavy hydrocarbons need to be avoided from the accidental delivery in to a manufacturing process. Such a system is more suitable for product delivery from transportable units such as ISO modules, cylinders, etc. Onsite purification system most likely would be using permanent purification unit such as adsorption beds and distillation columns to purify crude product stream.

EP 0949470 and U.S. Pat. No. 6,032,483 suggest a system for delivering purified vapor stream of liquid chemicals to a point of use. The system suggest a plurality of columns connected to each other where one of the arrangements is when the next (second) column receives a heavy liquid fraction from the preceding column for further product purification. UHP HCl for use in semiconductor manufacturing processes is prepared onsite by drawing HCl vapor from a liquid HCl reservoir and scrubbing the filtered vapor in a low=pH aqueous scrubber as suggested in TW 306021. The vapor stream is put through the scrubber before entering the line supplying it into the manufacturing process.

Patent US 2002128148A1 is describing a system to purify or decontaminate fluid ammonia. The system consists of a plurality of adsorbent beds where the contaminants accumulate. A portion of the ammonia stream is decomposed into hydrogen and nitrogen and the hydrogen is used to regenerate adsorbents. The described system does not let one to turn down the system changing production based on the manufacturing process demand rather then switch a number of adsorbent beds off in the case when the system has a plurality of such beds. The turn down ratio of the system may not vary in a wide range assuming that set product purity range is preserved when the system has only one bed. In addition, a portion of the product is used for decontamination of the beds which makes the system less efficient.

U.S. Pat. No. 6,372,022B1 describes a method and apparatus for purification and production of UHP chemicals based on ionic purifiers. The invention suggests a continuous process of purification and production UHP chemicals stream to be used in manufacturing processes and contaminated water stream carrying out contaminants removed from the product stream. The system assumes continuous delivery of the product and does not address the issue of the system turn down ratio.

U.S. Pat. No. 6,395,064 and WO 0145819 offered a system for vaporization and purification of a gas to UHP level to be used in semiconductor manufacturing process. The purified gas is routed to a buffer tank and then to a point of use in the manufacturing process.

U.S. Pat. No. 7,297,181 and WO 06005990 introduced a system for ammonia purification where the system uses different means of ammonia purification such as adsorption and distillation to purify ammonia. The system also suggests a purified product storage tank equipped with vaporizers to vaporize liquid product and to supply it to the point of use on demand. In general, once the storage tack is full and there is no demand of the product, the system has to stop UHP ammonia production since there is no place to put the product. Typically, a restart of the system involved spikes in product purity which may be unacceptable for semiconductor manufacturing process. Therefore, the portion of the product and most important the restart product supply time may be inadequate for the end user.

Some publications concern with control systems providing automated adequate control to obtain the desired product purity. For example, a control system for distillation tower was suggested in CN 2011006332. The system utilizes and intelligent check machine a DCS system and onsite bus wherein the check machine obtains historical process data from DCS real-time database and controls the output value for liquid/vapor (L/V) ratio in the distillation tower. Therefore, the said L/V ration is managed and changed constantly to maintain and confirm high purity stable operation via system dynamic control. At the same time, one should note that the purity range may change if the flow rates in the distillation tower are below the minimum threshold.

However, those teachings typically do not offer a system with futures such as high turn down ratio and consistent range of supplied substances purity present simultaneously.

Thus, there is a significant need for an onsite purification plant (or system; plant and system are exchangeable) and methods which can deliver HP and UHP product within the predetermined purity range at variable product flow rates simultaneously. That is, system and method of onsite purification are needed which would combine both futures of delivering purified product at predetermined consistent purity range with high onsite purification plant turn down ratio.

BRIEF SUMMARY OF THE INVENTION

Present invention provides an onsite purification plant supplying purified chemicals, industrial, and specialty gases within a predetermined purity range while meeting the abrupt demand change for the purified product between 0% and 100% of its maximum designed production capacity.

In one aspect, the invention provides an onsite purification system comprising:
1) a feed stream comprising of a chemical or gas being purified;
2) at least two purification units for receiving and purifying the feed stream;
3) at least one purified stream out from the purification units;
4) an automatic stream control system for receiving the at least one purified stream; wherein the at least one automatic stream control system comprising: an output product junction and a feedback junction;
5) at least one product stream out from the at least one automatic stream control system; and
6) at least one feedback stream out from the automatic stream control system and into at least one of the at least two purification units.

In another aspect, the invention provides a process of purification a chemical or gas, comprising steps of:
providing a feed stream containing the chemical or gas;
providing an onsite purification system comprising:
1) at least two purification units; and
2) an automatic stream control system comprising: an output product junction and a feedback junction;
flowing the feed stream through the at least two purification units to provide a purified stream from the last purified unit of the at least two purification units; and
sending the purified stream to the automatic stream control system to divide the purified stream into an output product stream and a feedback stream according to product on demand;
wherein the output product steam maintaining the purity rang while the product on demand varying from 0% to 100% of a predefined maximum production capacity.

In yet another aspect, the invention provides a process of onsite purification of $NH_3$, comprising steps of:
providing a feed stream containing $NH_3$;
providing an onsite purification system comprising:
1) at least two distillation columns;
2) an automatic stream control system comprising: an output product junction and a feedback junction;
3) at least one vent outlet for each distillation column to remove volatile impurities; and
4) at least one purge outlet for each distillation column to remove heavy impurities.
flowing the feed stream through the at least two distillation columns to provide a purified stream from the last distillation column of the at least two distillation columns; and
sending the purified stream to the automatic stream control system to divide the purified stream into an output product stream and a feedback stream according to product on demand; wherein the output product steam maintaining the purity rang while the product on demand varying from 0% to 100% of a predefined maximum production capacity.

The chemical or gas is selected from the group consisting of $NH_3$, $HCl$, $Cl_2$, $NF_3$, $O_2$, $N_2$, $CO_2$, and combinations thereof.

The purification unit is independently selected from the group consisting of filter, absorption bed, distillation column, condenser, evaporator, and membrane.

When the purified stream contains liquid and vapor, the product stream and the feedback stream can independently contains liquid, vapor, or combination thereof. The feedback stream is sent back to at least the last purification unit to keep a fixed liquid to vapor ratio for maintaining the purity rang of the output product steam while the product on demand varying from 0% to 100% of the predefined maximum production capacity.

BRIEF DESCRIPTION OF SEVERAL VIEWS OF THE DRAWINGS

In the accompanying drawings forming a material part of this description, there are shown.

DETAILED DESCRIPTION OF THE INVENTION

Figure 1:
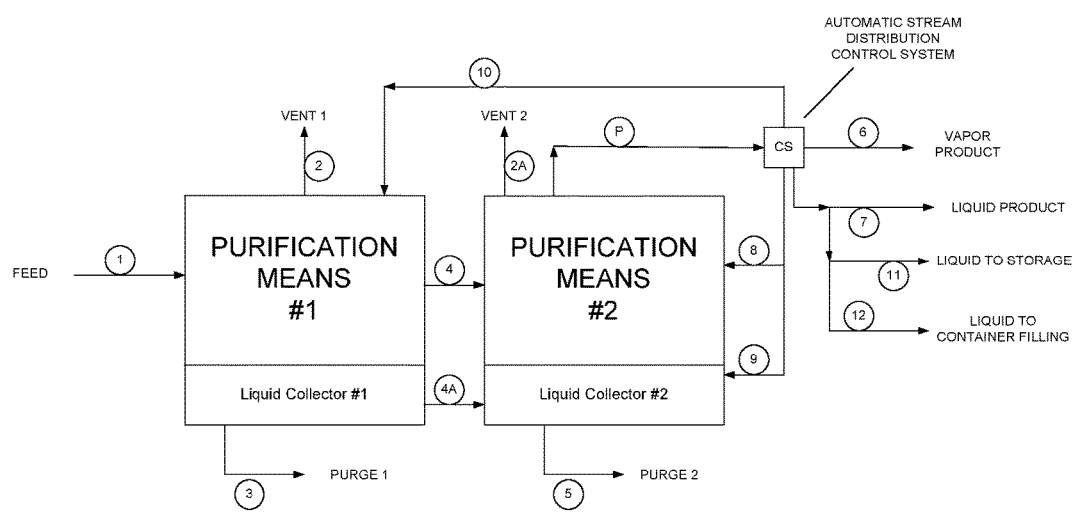
FIG. 1 depicts the flow diagram for one embodiment of onsite purification system/plant for use in accordance with the present invention

The present invention describes an onsite purification plant/system and method for onsite delivery of purified substances to manufacturing processes. The onsite purification plant provides turndown ratio from 0% to 100% while preserving the predetermined purity of the supplied substances within a predefined specification range.

The onsite purification plant turndown ratio is the ratio of a product flow at any given time to a maximum designed product flow. The plant turndown ratio is typically expressed as a fraction of a maximum designed product flow varying between 0 and 1 or as a percentage of the maximum designed product flow varying between 0% and 100%.

The substances mentioned herein may include but not limited to high purity and ultra high purity, process chemicals, industrial and specialty gases, etc. The chemicals and gases may include but not limited to, for example, $NH_3$, $HCl$, $Cl_2$, $NF_3$, $O_2$, $N_2$, $CO_2$, etc.

The predetermined purity refers to as a purity which was defined in all relevant details by, for example, an owner of a production or manufacturing facility.

It is understood that the predetermined purity defines a purity range. Purity range is an allowable purity variation of the supplied substances. Purity range defines that the supplied substances will be accepted into a manufacturing process if their purity stays within the predetermined purity range or will be rejected from the use in the said manufacturing process if their purity is found to be outside the predetermined purity range when tested. Therefore, the average supply product purity may be introduced as the average product purity calculated within the demanded and specified product purity range. The purity range of the supplied substances may be considered as an allowable purity deviation from the specified average product purity.

The purpose of the onsite purification plant is to deliver a product to a manufacturing process or number of processes, for example, to manufacturing processes in a semiconductor fabrication facility, with the predetermined range of the said product purity or the predetermined average product purity.

Any product delivery mode may be acceptable. Preferably, the product is produced and delivered to the point of use in a continuous manner. It is understood here that the demand for the supplied purified product quantity may vary from the predetermined maximum quantity to the predetermined minimum quantity or even to no product supply at all and vice versa. It is also understood here that the request for the product supply by manufacturing processes may change abruptly without any particularly preset schedule, that is, may be changed on a short notice or even without any notice at all.

Therefore, the onsite purification plant production abilities should include the following: immediate supply of the product upon the manufacturing process request; maintaining the supplied product purity within the predetermined purity range while the demanded product quantity may vary; product delivery can be increased from, for example, 0% product supply to its maximum of 100% product supply instantly upon the manufacturing process demand; the plant can also be capable to turndown product supply from 100% to 0% of its maximum upon the end user demand. It is yet important to realize that no specific product demand schedule may exist and the product supply demand may vary sporadically.

The onsite purification plant may contain several main elements to provide the abilities states above.

FIG. 1 depicts the flow diagram for one embodiment of onsite purification plant/system for use in accordance with the present invention.

In another arrangement, two purification units #1 and #2 may be assembled within the onsite purification plant in a way that they may share a common liquid collector. Therefore, the liquid streaming downwards inside each purification units is collected in the same liquid bath of the same liquid collector, which is a shared unit.

Figure 2:
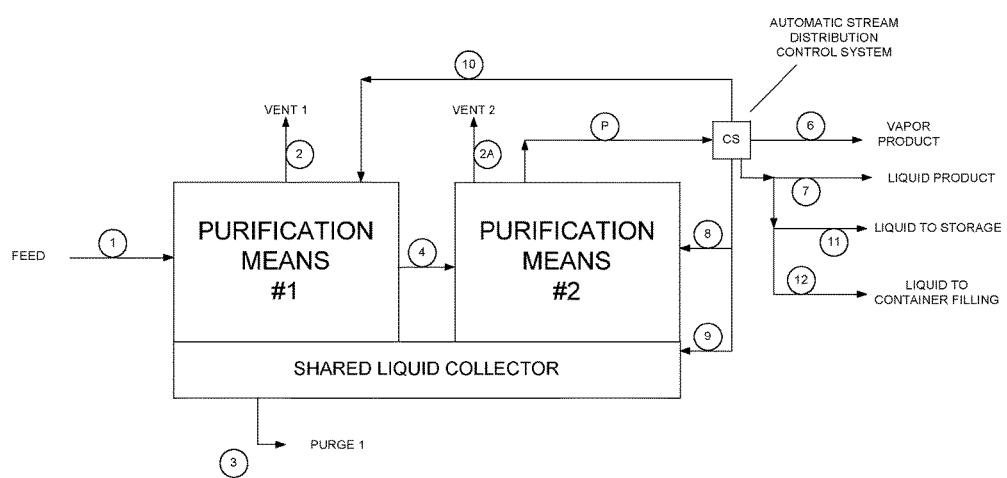
FIG. 2 depicts the flow diagram for another embodiment of onsite purification system/plant for use in accordance with the present invention

FIG. 2 depicts the flow diagram for an onsite purification plant/system for use in accordance with this embodiment.

FIG. 1 has two purification means or purification units (purification means and purification units are exchangeable) # 1 and # 2, and each one has its own liquid collector: #1 and #2. FIG. 2 also has two purification units # 1 and # 2, but two purification units share one common liquid collector (shown in FIG. 2 as Shared Liquid Collector).

The main elements in both Figures share the same functions as shown in FIGS. 1 and 2.

One of the elements is the feed stream 1. The source for the feed stream may come from the crude product storage, directly from production facility, industrial usage, any other source, or any combinations thereof, wherein the purification of the stream is needed.

A typical feed stream, or crude product may be defined, for example, as an industrial grade purity product and may be characterized, for example, by purity of 95%-98% or less. The product purity>99.9% will be considered as Ultra High Purity (UHP) product. Examples of HP purity range would be 99.5% to 99.9%, UHP range would be 99.91% to 99.99% or higher.

Two other elements of the onsite purification plant are purification units. The incoming feed stream is purified in the purification units #1 and #2.

The purification units may include but not limited to filters, adsorption beds, absorption beds, distillation columns, condensers, evaporators, membranes, or combinations thereof. A number of purification units (more than two) may be arranged together forming a combined onsite purification system. Such a system may be used to achieve the required product purification level from the incoming feed stream. A simple impurity purge system may also be considered as purification units, which is known as flush purification. It may be used by itself or in conjunction with other purification units such as, for example, units utilizing distillation or vaporization processes.

For example, at least one of the purification units in FIGS. 1 and 2 can be a distillation column. In one example, both purification units in FIG. 2 can be distillation columns.

Venting may help to free product stream from volatile impurities, for example, from light hydrocarbons. Vent streams 2 and 2a shown in FIGS. 1 and 2 operate in conjunction with purification units #1 and #2 for removing volatile impurities, respectively.

Purging, liquid extraction or draining, of a fraction of liquid may also be considered as part of a purification units. For example, liquid extraction from the bottom of the distillation columns or condensers can remove nonvolatile impurities such as, for example, heavy hydrocarbons. Purging streams 3 and 5 shown in FIG. 1, and stream 3 in FIG. 2, are for liquid extraction.

Both venting and liquid extraction may be necessary to achieve the required product purity.

The crude product stream becomes a product stream, or product steams, once the crude product stream is purified and the level of purification satisfies the predetermined product specification criteria.

The onsite purification plant has an automated stream distribution control system (CS) installed. The automatic stream control system CS can include a product collection and product return junctions, or an output product junction and a feedback junction. The CS divides the purified stream into an output product stream and a feedback stream according to a product demand.

These junctions are used to forward the output product stream to the production lines: stream 6 (vapor), stream 7 (liquid) and subsequently streams leading to the storage and transportable container filling station, streams 11 and 12 respectively; and feed the purified stream back into the onsite purification plant, through streams 8, 9, and 10 as shown in FIGS. 1 and 2.

The main function for the CS is to automatically control the feedback streams flowing into the onsite purification plant with respect to the product flows required by the manufacturing process or production lines at any point in time. The CS also controls the streams necessary to replenish the product in the optional storage facility and/or forward product into the product filling station shown as streams 11 and 12 in the FIGS. 1 and 2.

If the purity does not reach the predetermined level, for example, 99.99%, the CS will send the purified stream back to the purification units for further purification. If the purity reaches the predetermined level, the CS will determine the distribution of the purified streams to the product stream (or streams) and the feedback stream (or streams) according to the flows required by the manufacturing process at any point in time.

Thus, the automated stream distribution control system CS has several purposes: receiving the purified stream P from the last purification units #2; determine the purification level of the purified stream P; separating the purified stream into vapor and liquid; providing product vapor stream 6 and liquid steam 7 and subsequently 11 and 12; providing feedback (recycle) streams 8, 9 and 10; controlling product streams flow rates, controlling feedback streams flow rates; maintaining the purity range of the product streams. The list of the purposes of the SC and its functions shall not be limited to the examples mentioned above.

As shown in the FIGS. 1 and 2, vapor product is associated with stream 6 and liquid product is associated with stream 7. The product streams will then be delivered to a customer process via, for example, a pipe line. The conduit which connects the onsite purification plant outlet with a pipeline leading to the manufacturing process may also be considered as the element of the onsite purification plant.

The product purity may be also checked once again before the product enters the manufacturing process, for example, inside a semiconductor manufacturing facility. Such an additional check may be necessary to increase assurance that the product consistently stays within the predetermined purity range at all times and the product supply line is not contaminated. The product purity check system at these points may or may not be considered as the element or part of the onsite purification plant control system.

The product may be introduced as a liquid, as a vapor, or both into the product delivery lines attached to the onsite purification plant and leading to the manufacturing processes. Product delivery may occur through a single or multiple product delivery lines. In fact, the line for delivery of the vapor and liquid fractions may be separated at the onsite purification plant in the case when both fractions are needed for delivery into the manufacturing processes.

When liquid fraction is the only fraction, the liquid can be delivered into the manufacturing intake line. This line may be split into several lines introducing the product into several different manufacturing processes. These processes may be located within the same semiconductor fabrication facility or even in different fabs located in close proximity from each other. A vaporizing system may be used in one or more liquid delivery lines if vapor fraction is required in one or more manufacturing process. This approach may help to reduce the product delivery line size. Often a good thermal insulation of a liquid delivery line may be required.

On the other hand, a vapor delivery line may be the only line leading from the onsite purification plant into the manufacturing processes. This may be a preferred way of product delivery in the case when liquid product fraction is not used at the semiconductor manufacturing processes. In this case, the delivery line may not require a thorough thermal insulation as that for the liquid line but may be significantly larger in size compared to the liquid delivery line. Typically, economic analysis and fabrication facility requirements dictate specifications of the onsite purification plant delivery lines and the delivered product state.

As it was mentioned above, product purification units may be different, for example, adsorption beds, distillation columns, etc. The purification units or their combination may be chosen based on predetermined product purity specification and what needs to be purified. Often, a distillation column or a number of distillation columns may be used to purify at least a portion of the product feed stream to a satisfactory product purity level compliant with manufacturing processes. A typical problem with that kind of purification technology is the onsite purification plant turndown ratio. The product demand may be sporadic, that is, may not have well defined product demand cycles or schedules. In fact, the product demand may vary significantly from, for example, 100% of the purified product flow rate, that is, maximum production supply capacity of the onsite plant, to a small fraction of the maximum purified product supply capacity from the said onsite plant. The opposite is also true. The demand may grow from being at a very small level or even at no supply at all to the maximum demand and back to any product supply levels. That may happen within short time periods which may be unpredictable and may depend on circumstances related to the production of the semiconductor devices.

A product with predetermined purity may be produced when the distillation column is operated in a preferred production regime. A relatively small scaled down product production may be allowed, for example, up to 80% of the maximum designed production capacity but not too drastically different from that. Greater turndown of the distillation column production may lead to some significant variations in product purity, which may not be acceptable for the final user. In addition, product purity may be outside the predetermined specification range when distillation column operation has to be stopped and restarted again as it may happen when the demand for the purified product is not there for a prolong period of time. Usually, it takes some time to bring distillation column back to the stage when the predetermined product purity may be achieved and the product may be accepted by the end user again.

It is necessary to mention here that liquid to vapor ratio, referred to as L/V ratio thereafter, typically changes inside a distillation column when the column production rate changes. The L/V ratio may be used as an indirect indicator or judgment for the achieved product purity level. Therefore, maintaining L/V ratio at the same level at all times inside a distillation column helps to achieve stability of the product purity delivered from the onsite purification plant when distillation purification units is used.

An ordinary approach of venting the excess product from a purification plant may be used to maintain product purity when onsite purification plant complete shutdown is not an option. Either one or both product fractions, that is, liquid or vapor fraction may be used for excess product vent. This approach may necessitate additional equipment and processes to handle the vented excess product. For example, a vented excess product scrubbing system may be required especially if the product was categorized as toxic. That leads to product losses and potential increase in both the onsite purification plant and product costs.

The present invention discloses an on-site purification plant (system) that can preserve L/V ratio in a distillation column and therefore, to ensure that the delivered product stays in the predetermined product purity ranges without any venting of the un-demanded product.

Suppose the onsite purification system consist of two purification units, and at least one of which is a distillation column. The distillation column operates at a constant LN ratio at all times even when the product flow to the user is varied widely or completely stopped.

Indeed, as shown in FIGS. 1 and 2, at least a portion of the product may be return back to the purification units. In the exemplary embodiments, the product may be returned back to the liquid collector via line 9. The liquid collector #2 is part of the purification unit #2, which can be a distillation column in this example. This way, a constant flow rate inside that distillation column may be maintained at all times regardless of the product demand at the product delivery lines 6 and/or 7.

It is understood here that the product stream flow rate returned to the purification unit may change, that is, the returned product stream flow rate may be increased or decreased depending on the product demand from the manufacturing process. It is also understood here that the total product flow rate calculated as a sum of the product flow rates delivered to the manufacturing process and back to the purification plant is kept constant at all times. For example, if the stream delivered to the manufacturing process, for example, stream 6 and/or 7 accounts for 40% of the maximum column production ability then the stream returned back to the onsite plant, for example, stream 8, and/or 9, and/or 10 accounts for 60% of that. As the product demand changes at the manufacturing process the stream returned to the onsite purification plant changes accordingly. Thus, from the end user perspective, the turndown ratio of the onsite purification plant may vary between 0% and 100% at any point in time. From the onsite purification plant perspective, the total product production rate is kept constant at any point in time and, therefore, L/V ratio is kept constant inside at least one distillation column. The latter ensures the production of the product within the predetermined purity range.

The arrangement in FIG. 2 may achieve better effect since this embodiment provides easier control of maintaining constant L/V ratio in at least one of the distillation columns. That shared condenser concept also allows the elimination of vent streams from at least one of the distillation columns, for example, from the first one or from the second one.

An automated stream distribution control system (CS) is used for automatically controlling the flow back into the onsite purification plant with respect to the flow required by the manufacturing process at any point in time. 100% of product may be returned to the onsite purification plant in the case when, for example, there is no product demand from the end user, the storage facility is completely filled, and there is no demand at the product filling station. In another example, full onsite purification plant production capacity may be split between four lines, such as delivery line, product return line, product filling station line, and product storage refill line at any ratios. The latter is preferably accomplished automatically.

In addition, the product losses may be virtually eliminated since the product is returned back to the purification unit. Indeed, there is no need to vent the excess product out in order to maintain the onsite purification plant designed production rate. Therefore, neither of the product streams, that is, vapor and/or liquid stream, should be withdrawn from the onsite purification plant and forwarded into a waste treatment facility, for example, a scrubber in the case when the product is considered toxic.

The onsite purification plant concept allows not only for plant operation within a turndown ratio of 0% to 100% but also require no product losses and no additional waste treatment systems associated with handling excess product removal.

One should not be confused with clear distinction between the impurity purge stream and excess product vent stream.

The first one is associated with purification of the feed stream and is necessary to purify the latter to produce a product stream. This particular stream may be vapor and/or liquid and will not be eliminated from the onsite purification plant purification process. A waste treatment will be necessary for the impurity purge streams.

The other stream, that is, excess product removal stream, is associated with removal of an actual purified product from the onsite purification plant and treatment of that stream as a waste stream. In the proposed invention, the purified product excess stream will not be removed as a waste stream but rather will be returned back into the purification plant. Therefore, the waste treatment system which was associated with excess product venting shall be eliminated from the onsite purification plant purification process living in place only a significantly reduced waste treatment system associated with impurity purging streams. The proposed invention will help to achieve more economical product production and supply.

As it was discussed previously, the turndown ratio of the onsite purification plant may be required to vary in a wide range from the end user perspective, for example, from 100% product delivery flow rate, that is, the maximum designed product production rate, to no product delivery flow rate. The product may be redirected back into the onsite purification system as needed as shown in FIGS. 1 and 2. That will help to maintain L/V ratio, for example in the last distillation column of the onsite plant.

It is important to note that the product return may be accomplished for both vapor and liquid streams. Liquid stream return 9 may be directed straight into a liquid collector which may be shared by, for example, two distillation columns (as in FIG. 2). The vapor streams 8 and/or 10 may be directed into any section in the distillation columns above the liquid collector. In addition, the vapor stream may be directed into the liquid collector. Some vapor stream preparation may be required to do so. The vapor stream return may also be split and redirected to different purification units, such as shown in FIG. 2 lines 9 and 10. Also, these streams 9 and 10 may be introduced into different sections of those different distillation units #1 and #2 as shown in FIG. 2. Therefore, any portion of the product may be redirected back into a purification system when it is not in demand by a manufacturing process. The redirected portion of the product diminishes or increases as the product demand by a manufacturing process changes. In one of the exemplary embodiments the product vapor stream may be first condensed and then returned back to the product liquid collector.

The onsite purification plant shown in both FIG. 1 or 2, allows for a wide variation in product supply, that is, between 0% and 100% of product flow to the end user, without jeopardizing product quality and predetermined average product purity. In other words, the deviation of the product purity will consistently stay in predetermined product purity range while the product supply to the end user may vary widely. It is especially important to note that the present invention allows for instantaneous change in delivery of HP or UHP products to the end user. The instantaneous change in product delivery may happen without any delays associated with the product production at the onsite plant. In addition, no product loss is associated with a change in product demand from the onsite plant. The product loss may be minimized and, therefore, the overall purification system efficiency may be increased. Eventually that will be translated into a less expensive HP or UHP product.

The product collection stations shown in the Figures may be positioned strategically near different semiconductor fabrication lines or processes. The product collection stations may include temporary or permanent product holding vessels which may be used as the temporary or permanent process product storage facilities. The storage facilities may be used for simple product storage or for the purpose of shaving peak product consumptions if necessary. Indeed, the overall onsite purification system may be designed for the maximum production, which is less than possible maximum product consumption rate. The storage facility may come into play when temporary high product consumptions or so called peak product demands are required by manufacturing processes. The storage facilities may be used during these peak product demands helping to satisfy temporary maximum product flow into the manufacturing processes. The storages may be replenished via line 11 shown in the Figures once the product consumption goes back to normal.

The onsite purification system may also play a dual role not only supplying the designated end user but also functioning as a station for filling portable vessels. That may be convenient future of the onsite purification plant especially if it was positioned strategically advantages relative to the other possible product users. The filling station may be designed in such a way that it refills transportable vessels via line 12 during the product diminished demands from the onsite end user. It may be especially convenient if the onsite product end user may come up with a tentative schedule of the product demand. In that case the purification onsite purification plant may be optimized and designed to satisfy all mentioned above capabilities if necessary.

The embodiments of this invention listed above, are exemplary of numerous embodiments that may be made of this invention. It is contemplated that numerous other configurations of the process may be used, and the materials used in the process may be elected from numerous materials other than those specifically disclosed.

The invention claimed is:

1. An onsite purification system comprising:
   1) a feed stream comprising of a chemical or gas being purified;
   2) at least two purification units for receiving and purifying the feed stream;
   3) at least one purified stream out from the at least two purification units;
   4) an automatic stream control system for receiving the at least one purified stream and distributing the at least one purified stream into at least one product stream and at least one feedback stream; wherein the automatic stream control system consisting essentially of: an output product junction for the at least one product stream and a feedback junction for the at least one feedback stream; and
   5) at least one feedback stream out from the feedback junction and back into the at least two purification units.

2. The onsite purification system of claim 1, wherein the feed stream is an industrial grade purity product having a purity of <98%; and the at least one product stream is an industrial grade purity product having a purity of >99.5%.

3. The onsite purification system of claim 1, wherein the chemical or gas being purified is selected from the group consisting of $NH_3$, HCl, $Cl_2$, $NF_3$, $O_2$, $N_2$, $CO_2$, and combinations thereof.

4. The onsite purification system of claim 1, wherein the chemical or gas being purified is $NH_3$.

5. The onsite purification system of claim 1, wherein each of the at least two purification units is independently selected from the group consisting of filter, absorption bed, distillation column, condenser, evaporator, and membrane.

6. The onsite purification system of claim 1, wherein one of the at least two purification units is a distillation column comprising a fixed ratio of liquid vs vapor (L/V).

7. The onsite purification system of claim 1, wherein the at least two purification units comprise:
   1) at least one vent outlet for each of the at least two purification units to remove volatile impurities; and
   2) a liquid collector to collect liquid from all purification units;
      wherein the liquid collector comprises a purge outlet to remove heavy impurities.

8. The onsite purification system of claim 1, wherein the at least two purification units comprise:
   1) at least one vent outlet for each of the at least two purification units to remove volatile impurities; and
   2) a liquid collector to collect liquid from each of the at least two purification units;
      wherein the liquid collector comprises a purge outlet to remove heavy impurities.

9. The onsite purification system of claim 1, wherein the at least one product stream out from the output product junction comprises a vapor product stream and a liquid product stream.

10. The onsite purification system of claim 9, wherein the liquid product stream is sent to one selected from the group consisting of production process line, storage, transportable container filling station, and combinations thereof.

11. The onsite purification system of claim 1, at least one feedback stream out from the feedback junction comprises a vapor product stream and a liquid product stream.

12. The onsite purification system of claim 1, wherein the at least one feedback stream out from the feedback junction is sent back to the last purification unit of at least two purification units.

13. The onsite purification system of claim 1, wherein the at least one feedback stream out from the feedback junction comprises is sent back into each of the at least two purification units.

14. An onsite purification system comprising:
   1) a feed stream comprising of a chemical or gas being purified;
   2) at least two purification units for receiving and purifying the feed stream;
   3) at least one purified stream out from the at least two purification units;
   4) an automatic stream control system for receiving the at least one purified stream and distributing the at least one purified stream into at least one product stream and at least one feedback stream; wherein the automatic stream control system consisting essentially of: an output product junction for the at least one product stream and a feedback junction for the at least one feedback stream; and
   5) at least one feedback stream out from the feedback junction and back into the at least two purification units;

wherein the at least one product stream contains NH$_3$ having a purity of >99.5%.

15. The onsite purification system of claim 14, wherein each of the at least two purification units is independently selected from the group consisting of filter, absorption bed, distillation column, condenser, evaporator, and membrane.

16. The onsite purification system of claim 14, wherein one of the at least two purification units is a distillation column comprising a fixed ratio of liquid vs vapor (L/V).

17. The onsite purification system of claim 14, wherein the at least two purification units comprise:
   3) at least one vent outlet for each of the at least two purification units to remove volatile impurities; and
   4) a liquid collector to collect liquid from all purification units or a liquid collector collect liquid from each of the at least two purification units;
      wherein the liquid collector comprises a purge outlet to remove heavy impurities.

18. The onsite purification system of claim 14, wherein the at least one product stream out from the output product junction comprises a vapor product stream and a liquid product stream; wherein the liquid product stream is sent to one selected from the group consisting of production process line, storage, transportable container filling station, and combinations thereof.

19. The onsite purification system of claim 14, wherein the at least one feedback stream out from the feedback junction comprises a vapor product stream and a liquid product stream.

20. The onsite purification system of claim 14, wherein the at least one feedback stream out from the feedback junction is sent back to the last purification unit of at least two purification units.

* * * * *